(12) United States Patent
Ishaaya et al.

(10) Patent No.: US 8,953,648 B2
(45) Date of Patent: Feb. 10, 2015

(54) FIBER LASER PUMPING CONFIGURATION AND METHOD

(75) Inventors: Amiel Ishaaya, Nes Ziona (IL); Boris Shulga, Dimona (IL)

(73) Assignee: Ben-Gurion University of the Negev Research & Development Authority, Beer Sheva (IL)

( * ) Notice: Subject to any disclaimer, the term of this patent is extended or adjusted under 35 U.S.C. 154(b) by 0 days.

(21) Appl. No.: 13/813,273

(22) PCT Filed: Jun. 23, 2011

(86) PCT No.: PCT/IL2011/000502
§ 371 (c)(1),
(2), (4) Date: Jan. 30, 2013

(87) PCT Pub. No.: WO2012/014191
PCT Pub. Date: Feb. 2, 2012

(65) Prior Publication Data
US 2013/0128904 A1    May 23, 2013

Related U.S. Application Data

(60) Provisional application No. 61/344,467, filed on Jul. 30, 2010.

(51) Int. Cl.
*H01S 3/30* (2006.01)
*H01S 3/067* (2006.01)
(Continued)

(52) U.S. Cl.
CPC ............. *H01S 3/067* (2013.01); *H01S 3/06733* (2013.01); *H01S 3/094019* (2013.01);
(Continued)

(58) Field of Classification Search
CPC . H01S 3/067; H01S 3/06708; H01S 3/06733; H01S 3/06754; H01S 3/0813; H01S 3/08077; H01S 3/091; H01S 3/093; H01S 3/0933; H01S 3/094007
USPC ......................................... 372/6, 9, 29.02, 69
See application file for complete search history.

(56) References Cited

U.S. PATENT DOCUMENTS

| 5,864,644 A | 1/1999 | DiGiovanni et al. |
| 5,999,673 A | 12/1999 | Valentin et al. |

(Continued)

FOREIGN PATENT DOCUMENTS

| WO | WO/2007/006317 | 1/2007 |
| WO | WO/2008/083482 | 1/2008 |

OTHER PUBLICATIONS

Encyclopedia on Laser Physics and Technology, RP Photonics, http://www.rp-photonics.com/side_pumping.html).

(Continued)

*Primary Examiner* — Dung Nguyen
(74) *Attorney, Agent, or Firm* — Hunton & Williams LLP (57) ABSTRACT

The invention is an apparatus and method for free space pumping of active double-clad fiber based lasers and amplifiers. The apparatus comprises a laser emitting a signal laser beam; an active double-clad fiber having a core defining an optical axis of the apparatus and a pump cladding defining a cone of numerical aperture; an optical arrangement directing the signal laser beam along the optical axis through the core of the active double-clad fiber; at least one pump source emitting a pump beam; at least one delivery means coupling the pump beam to the pump cladding of the active double-clad fiber; and an optical arrangement coupling the amplified signal laser beam exiting the active double-clad fiber out of the apparatus.

18 Claims, 11 Drawing Sheets

(51) Int. Cl.
*H01S 3/094* (2006.01)
*H01S 3/08* (2006.01)
*H01S 3/0941* (2006.01)
*H01S 3/16* (2006.01)

(52) U.S. Cl.
CPC ......... *H01S3/06741* (2013.01); *H01S 3/06754* (2013.01); *H01S 3/08059* (2013.01); *H01S 3/094007* (2013.01); *H01S 3/094011* (2013.01); *H01S 3/09408* (2013.01); *H01S 3/09415* (2013.01); *H01S 3/1618* (2013.01)
USPC .................. 372/6; 372/9; 372/29.02; 372/69; 372/75

(56) References Cited

U.S. PATENT DOCUMENTS

| | | | |
|---|---|---|---|
| 6,477,295 | B1 | 11/2002 | Lang et al. |
| 7,046,875 | B2 | 5/2006 | Gonthier et al. |
| 7,221,822 | B2 | 5/2007 | Grudinin et al. |
| 2002/0076153 | A1 | 6/2002 | Hollister et al. |
| 2008/0050069 | A1 | 2/2008 | Skovgaard et al. |
| 2008/0267227 | A1 | 10/2008 | Seo et al. |
| 2009/0080472 | A1 | 3/2009 | Yao et al. |
| 2011/0249320 | A1* | 10/2011 | Savage-Leuchs et al. . 359/341.3 |

OTHER PUBLICATIONS

Faucher et al., "High Power Monolithically Integrated All-Fiber Laser Design Using Single-Chip Multimode Pumps for High Reliability Operation," Proc. of SPIE, vol. 6873 (2008).

Hanna et al., "An Ytterbium-Doped Monomode Fibre Laser: Broadly Turnable Operation from 1-010 μm to 1-162 μm and Three-Level Operatoin and 974 Nm," Journal of Modern Optics, Issue 37, pp. 517-525, Downloaded on Dec. 30, 2012.

Hansen et al., "Airclad Fiber Laser Technology," Proceedings of SPIE, pp. 6873, 687307 (2008).

IPRP of PCT/IL2011/000502, mailed Feb. 14, 2013.

Jauregui-Misas et al., "All-Fiber Side Pump Combiner for High-Power Fiber Lasers and Amplifiers," Photonic West, vol. 7580, p. 75801E (SPIE, 2010).

Kim et al.,"Monolithic All-Glass Pump Combiner Scheme for High-Power Fiber Laser Systems," Optical Express, vol. 18, Issue 12, pp. 13,194-13,203, Jun. 4, 2010.

Koplow et al., "A New Method for Side-Pumping of Double-Clad Fiber Sources," Journal of Quantum Electronics, vol. 39, No. 4, pp. 529-540, Apr. 2003.

Larsen et al., "Side Pumping of Double-Clad Photonic Crystal Fibers," Optics Letters, vol. 29, Issue 5, pp. 436-438, Mar. 1, 2004.

Limpert et al., "Fiber-Based High Power Laser Systems," http://www.rp-photonics.com/highpowerfiberlasers.html.

Mortensen, "Air Clad Fibers: Pump Absorption Assisted by Chaotic Wave Dynamics?," Optics Express, vol. 15, No. 14, pp. 8898-8996, Jul. 5, 2007.

NKT Photonics, "Double-Clad Photonic Crystal Fibers," http://www.nktphotonics.com.

NKT Photonics, "Pump Absorption in Rod Fibers," V. 1.1, Jul. 2009.

NKT Photonics, Ytterbium Doped PM ROD Fiber with Ultra Large Mode Area.

Ripin et al., "High Efficiency Side-Coupling of Light into Optical Fibres using Imbedded V-Grooves," Electronics Letters, vol. 31, No. 25, pp. 2204-2205, Dec. 7, 1995.

Schmidt et al., "Single-Polarization Ultra-Large-Mode-Area Yb-Doped Photonic Crystal Fiber," Optical Express, vol. 16, Issue 6, pp. 3918-3923, Mar. 10, 2008.

Xu et al., "A Non-fused Fiber Coupler for Side-Pumping of Double-Clad Fiber Lasers," Opt. Commun., 220(4-6), pp. 389-395 (2003).

Jelger, P. et al., "Efficient skew-angle cladding-pumped tunable narrow-linewidth Yb-doped Fiber Laser," (2007) Optic Letters, vol. 32, No. 24, pp. 3501-3503.

* cited by examiner

FIBER LASER PUMPING CONFIGURATION AND METHOD

CROSS-REFERENCE TO RELATED APPLICATIONS

This application is the national phase application of PCT/IL2011/000502, filed Jun. 23, 2011, which claims the benefit of U.S. Provisional Patent Application 61/344,467, filed Jul. 30, 2010, the contents of each are hereby incorporated by reference in their entirety to the extent they do not conflict with the below disclosure.

FIELD OF THE INVENTION

The present invention relates to the field of lasers and laser amplifiers. Specifically, the invention relates to the field of pumping methods for fiber lasers and amplifiers.

BACKGROUND OF THE INVENTION

Publications and other reference materials referred to herein, including references cited therein, are incorporated herein by reference in their entirety and are numerically referenced in the following text and are respectively grouped in the appended bibliography which immediately precedes the claims.

Until recently, the conventional methods for pumping active double-clad fibers, as a part of fiber lasers or amplifiers, involved mainly on-axis coupling through a dichroic mirror. On-axis pumping means that both pump and signal (laser) beams share the same optical axis outside of the fiber.

In recent years, there have been many efforts to separate the laser and pump beam directions with various off axis or sidewise pumping configurations. Off-axis (sidewise) pumping means the pump and laser beams are separated and do not share the same optical axis (outside of the fiber) when coupled into the fiber. This has been demonstrated by various methods [1-5]. Some methods are based on altering the pump cladding, such as angle-polishing of the fiber [6], embedded-mirrors [7], V-groove coupling [8] and capillary techniques [9].

However, these methods suffer from low damage threshold due to adhesives, mechanical instability, and require partial damaging of the fibers. Other techniques that have been used include tapering and/or splicing to couple pump fibers to an active fiber [10-13]. Alternatively, there are also techniques in which the pump is reflected into the active fiber by using a dichroic (interference filter) element [14, 15]. Moreover, some techniques used today in commercial fiber lasers and amplifiers are based on the principle of leakage from the pump fibers to the active fiber over a long interaction length [16, 17]. With most of the above methods it is impossible to couple the pump light efficiently into double-clad photonic crystal fibers (PCF) due to their air cladding structure. Additional examples of limitations with the prior art are the need to alter or perform some kind of processing on the fiber or that the end facet of the fiber is not freely usable.

In order to obtain from a fiber laser short laser pulses with high levels of output peak power and good beam quality (in a system with small physical dimensions), it is essential to use active double-clad PCFs. The most significant advantage of a PCF, in this context, is the extremely large core cross section and the high numerical aperture (NA) of the pump cladding, especially with the rod-type PCF. Another key advantage of side pumping is that it allows the use of pump sources with very low spatial coherence, such as arc lamps or high-power diode bars. Also, side pumping makes it easy to combine multiple pump sources. [18]

It is an object of the present invention to provide a new method for free space pumping of active double-clad fiber based lasers and amplifiers.

It is another object of the present invention to provide a new method for free space pumping of active double clad PCF based lasers and amplifiers.

It is another object of the present invention to provide a method that is based on off-axis injection of the pump beam, exploiting the high numerical aperture (NA) of the fiber pump cladding.

It is another object of the present invention to provide a method that can be applied to a variety of different types of active double-clad fibers.

It is another object of the present invention to prevent feedback from the laser into the pump source.

It is another object of the present invitation to provide a method in which the optical elements for the pump and signal beams are completely separated.

It is another object of the present invention to provide a method where there is no requirement for any special treatment to the fiber.

It is another object of the present invention to provide apparatus for carrying out the method of the invention.

Other objects and advantages of the invention will become apparent as the description proceeds.

SUMMARY OF THE INVENTION

In a first aspect the invention is an apparatus for free space pumping of active double-clad fiber based lasers and amplifiers. The apparatus comprises:
   a) a laser that emits a signal laser beam;
   b) an active double-clad fiber having a core that defines an optical axis of the apparatus and a pump cladding that defines a cone of numerical aperture (NA);
   c) an optical arrangement adapted to direct the signal laser beam along the optical axis through the core of the active double-clad fiber;
   d) at least one pump source, each of which emits a pump beam;
   e) at least one delivery means adapted to couple the pump beam to the pump cladding of the active double-clad fiber; and
   f) an optical arrangement to couple the amplified signal laser beam that exits the active double-clad fiber out of the apparatus.

A separate one of the delivery means is used to couple each of the pump beams to the pump cladding of the active double-clad fiber from a separate direction but at the same off-axis angle with respect to the optical axis of the apparatus. Each of the pump beams is coupled to the pump cladding through an end facet of the active double-clad fiber.

In embodiments of the invention the delivery means can be at least one of: focusing optics and delivery optical fibers. If the delivery means are delivery optical fibers, the apparatus may comprise a monolithic coupler at one or both end facets of the active double-clad fiber. The monolithic coupler is adapted to couple pump light that exits the delivery optical fibers and the signal laser beam respectively into the pump cladding and the central core of the double-clad active fiber.

In embodiments of the apparatus of the invention the pump source is a pump diode.

In embodiments of the apparatus of the invention the active double-clad fiber can be selected from the group comprised of: photonic crystal fibers (PCF), standard step-index fibers, standard gradient index fibers, and large mode area (LMA) fibers.

In embodiments of the apparatus of the invention the off-axis angle is within the cone of numerical aperture (NA) that is defined by the pump cladding of the active double-clad fiber. Embodiments of the invention comprise multiple, independent off-axis pump sources that are oriented to introduce pumping light through the end facets at into both ends of the active double-clad fiber from several directions within the cone of numerical aperture (NA).

Embodiments of the apparatus of the invention are adapted to comprise multiple pump passes in the active double-clad fiber. The multiple passes can be achieved by the use of two concave mirrors one of which is located on each side of the active double-clad fiber or by collimating spherical lenses with flat mirrors.

In a second aspect the invention is a method for free space pumping of active double-clad fiber based lasers and amplifiers. The method comprises:
 a) providing a laser that emits a signal laser beam;
 b) providing an active double-clad fiber having a core that defines an optical axis of the apparatus and a pump cladding that defines a cone of numerical aperture (NA);
 c) providing an optical arrangement adapted to direct the signal laser beam along the optical axis through the core of the active double-clad fiber;
 d) providing at least one pump source, each of which emits a pump beam;
 e) providing at least one delivery means adapted to couple the pump beam to the pump cladding of the short length of active double-clad fiber; and
 f) providing an optical arrangement to couple the amplified signal laser beam that exits the active double-clad fiber out of the apparatus.

A separate one of the delivery means is provided to couple each of the pump beams to the pump cladding of the active double-clad fiber from a separate direction but at the same off-axis angle with respect to the optical axis of the apparatus. Each of the pump beams is coupled to the pump cladding through an end facet of the active double-clad fiber.

In embodiments of the method of the invention the delivery means is at least one of: focusing optics and delivery optical fibers. If the delivery means are delivery optical fibers, the method may comprise a monolithic coupler at one or both end facets of the active double-clad fiber. The monolithic coupler is adapted to couple pump light that exits the delivery optical fibers and the signal laser beam respectively into the pump cladding and the central core of the short length of active double-clad fiber.

In embodiments of the method of the invention the pump source can be a pump diode.

In embodiments of the method of the invention the active double-clad fiber can be selected from the group comprised of: photonic crystal fibers (PCF), standard step-index fibers, standard gradient index fibers, and large mode area (LMA) fibers.

In embodiments of the method of the invention the off-axis angle is within the cone of numerical aperture (NA) defined by the pump cladding of the active double-clad fiber.

Embodiments of the method of the invention can comprise multiple independent off-axis pump sources that are oriented to introduce pumping light through the end facets at into both ends of the active double-clad fiber from several directions within the cone of numerical aperture (NA).

Embodiments of the method of the invention can comprise multiple pump passes in the active double-clad fiber. The multiple passes can be achieved by the use of two concave mirrors one of which is located on each side of the active double-clad fiber or by collimating spherical lenses with flat mirrors.

All the above and other characteristics and advantages of the invention will be further understood through the following illustrative and non-limitative description of embodiments thereof, with reference to the appended drawings. In the drawings the same numerals are sometimes used to indicate the same elements in different drawings.

DETAILED DESCRIPTION OF EMBODIMENTS OF THE INVENTION

In order to obtain from a fiber laser short nanosecond pulses with high peak power and good beam quality in a system with small physical dimensions, it is very advantageous to use active double-clad PCFs [19]. The most significant advantages of a PCF in this context is the extremely large core cross section, the high NA of the pump cladding, and the high pump absorption.

Figure 1:
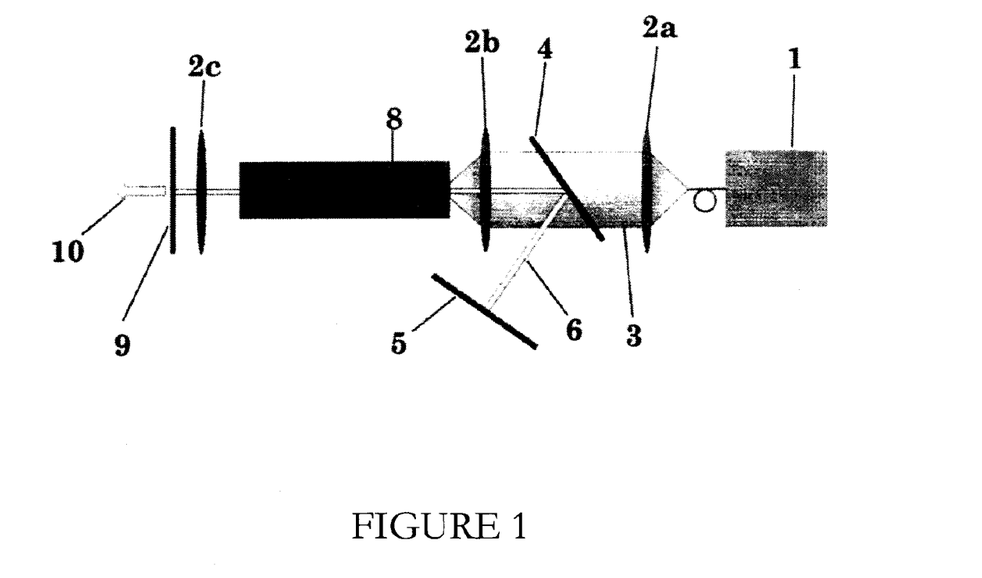
FIG. 1 is a schematic drawing of an apparatus used in a prior art on-axis pumping method.

The standard free space on-axis pumping configuration in a typical PCF laser is shown schematically in FIG. 1. The resonator is composed of a highly reflective flat rear dichroic mirror (4) to couple the light (3) from the pump diodes (1) into the resonator. Two lenses, (2b) and (2c) focus and collimate both the beam from laser (6) and the pump beam (3) into a short length of active fiber (8), which is typically an Yb doped double-clad PCF with a low NA large diameter core and a high NA pump cladding. The amplified laser beam (10) exits the active fiber (8) through lens (2c) and a flat output coupler (9). In all of the figures the numeral (5) designates the laser rear mirror.

In this configuration the rear lens (2b) is responsible for focusing the pump beam (3) into the pump cladding and for collimating and refocusing the laser beam (6) into the fiber core (8). Thus this lens (2b) has to be designed and fabricated for both the pump and lasing wavelengths. Furthermore, the dichroic mirror (4) has to differentiate between two close wavelengths, typically the pump wavelength at 976 nm and the laser wavelength in the range of 1030-1080 nm.

Since the dichroic mirror (4) is not ideal, additional dichroic mirrors or pump guards are often used in the pump channel to further reduce the risk of feedback from the laser into the pump diodes (1). This is especially needed in the case of pulsed high peak power laser operation.

Figure 2:
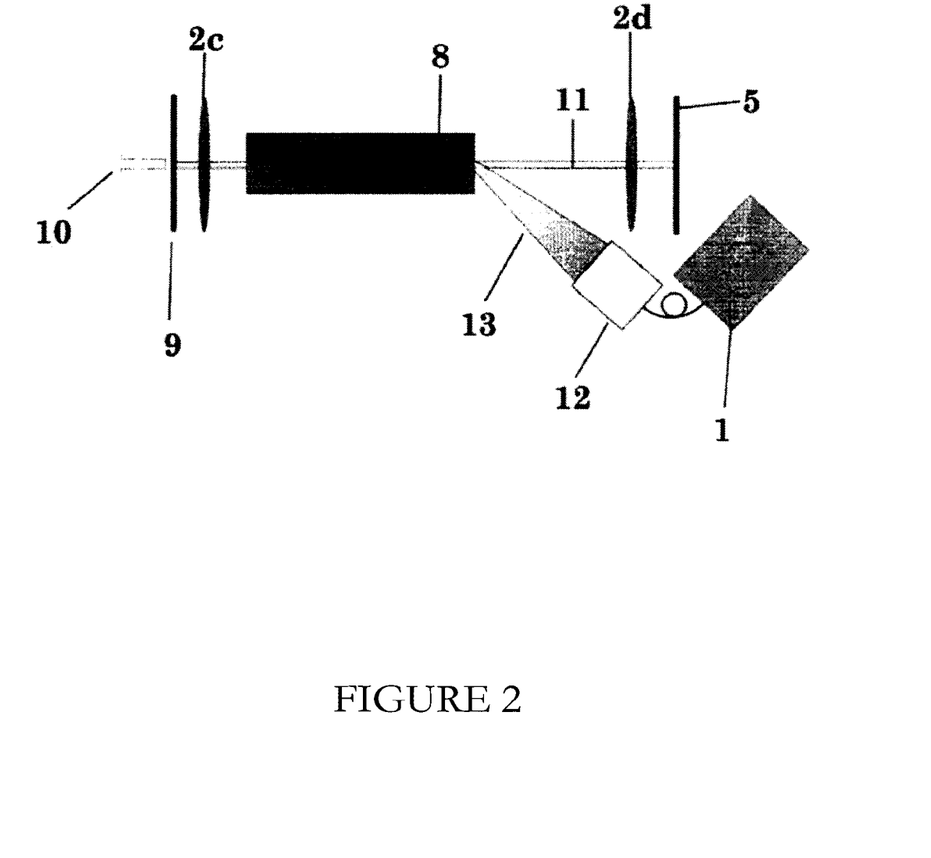
FIG. 2 is a schematic drawing of an apparatus used in an embodiment of the off-axis free space pumping method of the invention.

FIG. 2 schematically shows the off-axis pumping configuration of the present invention. This configuration resembles that of FIG. 1, but the intracavity dichroic mirror (4) is removed and the resonator is not folded. The pump beam (13) is coupled to the pump cladding from a separate off-axis direction with a dedicated lens (12). As a result, the risk of damage to the pump diodes (1) due to feedback from the laser (11) does not exist. The pump beam (13) enters the pump cladding through an end facet of the active fiber (8); therefore the limitations of prior art methods of off-axis pumping described herein above are eliminated. Furthermore, the intracavity losses of the dichroic mirror (4), shown in FIG. 1, are eliminated and, because the pump optics (12) and laser optics (2d) are completely separate, there is a better optimization for laser performance. Finally, with the off-axis configuration the resonator is shorter (unfolded) and hence can be potentially engineered in a more compact manner than the conventional on-axis pumping configuration that is shown in FIG. 1.

The off-axis configuration of the invention is based on exploiting the high NA of the pump cladding. In double-clad PCFs the high NA results from the air-clad that surrounds the pump clad and provides high index contrast. Typical PCF pump clad NA values are about 0.6 m while typical core NA values are only about 0.02 [20]. Commercial high brightness fiber coupled pump diodes with high output power (30-200 W) are currently available with 105 μm or 200 μm core diameters and with a NA of 0.15 or 0.22, respectively. Since these NA values are considerably lower than the pump cladding NA of the PCF, and the PCF core has a very low NA, it is possible to efficiently couple the pump light in an off-axis manner, while still maintaining a clear path for the signal laser, all in a geometrically reasonable configuration. Furthermore, it is possible to scale the off-axis configuration of the invention to include multiple independent pump sources, each situated at a different position with respect to the optical axis, but with the same off-axis angle. The scalability should not be considered in terms of surpassing the overall pumping power limit into the fiber, but in terms of ease of adding additional independent "risk-free" pump sources without changing the laser resonator.

Finally, apart from obtaining lower intracavity losses due to the absence of the dichroic mirror (4), of the on-axis method, the resulting pump absorption in the fiber may be higher compared to that in the on-axis pumping configuration. This is because a significantly higher percentage of the pump light (13) is coupled at large angles, and in an asymmetrical way [21]. This is further emphasized when the on-axis pump beam NA would be lower than the fiber pump cladding NA and only partially fill it.

To demonstrate the effectiveness of the off-axis method the inventors performed experiments using two configurations similar to those shown in FIG. 1, and FIG. 2. In the experiments the active fiber (8) was a commercially available 55 cm long Yb doped polarization maintaining rod-type PCF (NKT Photonics DC-200/70-PM-Yb-ROD) [20, 22] with the following features: a 70 μm diameter Yb doped core with 0.02 NA surrounded by four rings of air holes; a 200 μm pump cladding with 0.6 NA surrounded by an air clad; polarization maintaining Boron stress rods situated in the pump cladding; a surrounding 1.7 mm non flexible silica jacket for preventing any bend losses or mechanical perturbations; two 8.2 mm diameter, 8 mm length, anti-reflection coated end caps. The specified pump light absorption in the PCF was 30 dB/m at 976 nm, and the fiber core was rated by the manufacturer single mode $TEM_{00}$ [20].

The laser rear mirror (5) and output coupler (9) had high and partial reflectivity between 1030-1080 nm, respectively, and the focal length of the lens (2c) next to the output coupler (9) was 70 mm. The pump source (1) consisted of a fiber coupled single emitter 9 W CW diode laser operating at 976 nm (wavelength stabilized with a TEC), with a FWHM bandwidth of 4 nm, and a delivery fiber of 105 μm core diameter and 0.22 NA. Narrower bandwidth pump diodes allowed for higher pump absorption [23], which is beneficial for short high peak power lasers.

With the prior art on-axis configuration shown in FIG. 1, the resonator length was approximately 1 m, and the focal length of the lens (2b) close to rear end of the resonator was 40 mm. This lens (2b) focused both the pump and the laser beams into the fiber (8). The dichroic mirror (4), which was used to couple the pump beam (3) into the resonator, was highly transmissive at 976 nm and highly reflective between 1030-1080 nm (s-polarization).

With the off-axis configuration of the invention, shown in FIG. 2, the dichroic mirror (4) was removed, the rear intracavity lens (2b) was replaced with a different lens (2d), and the overall length of the resonator was shortened to 0.8 m. The focal length of the rear intracavity (laser) lens (2d) was 70 mm, while that of the focusing lens (12) for the off-axis pump beam (13) was 50 mm, allowing for mutual coupling of both pump and laser beams into the fiber (8) at a relative angle of 20 degrees.

Figure 3:
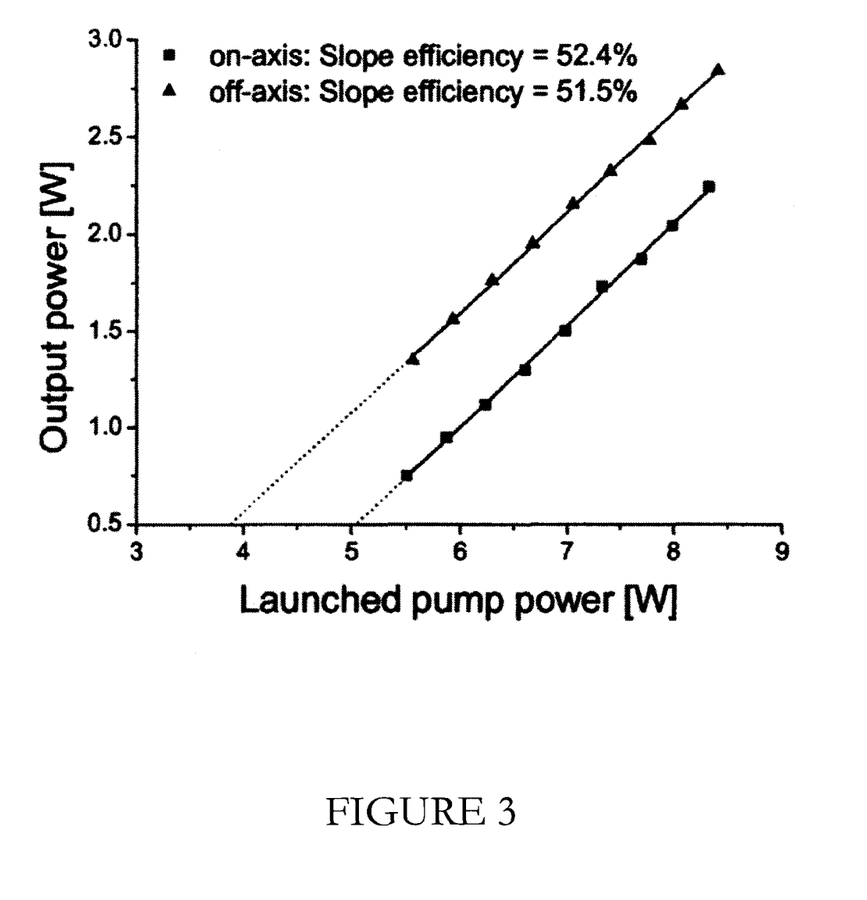
FIG. 3 shows graphs of the laser output power as a function of input pump power for on-axis and off-axis pumping configurations.

FIG. 3 shows graphs of measured laser output power as a function of input pump power. The lower graph (marked by squares) is for the on-axis pumping method of the prior art and the upper graph (marked by triangles) is for the off-axis pumping method of the invention. Both configurations use the same output coupler with 20% reflectivity. With the on-axis configuration the maximum output power was 2.24 W, the slope efficiency was 52.4%, and the pump power at threshold was 4.1 W. With the off-axis configuration the maximum output power was 2.84 W, the slope efficiency was 51.5%, and the threshold was 2.9 W.

The efficiency slopes obtained in both configurations were somewhat low compared to reported efficiency slopes with similar rod-type PCFs [24]. The inventors believe that this was due to the relatively low pump powers in the experiments leading to a strong gradient of population inversion along the fiber. Since Yb:Silica lasing at the shorter wavelengths (1030-1050 nm) is basically a quasi three level system [25], unpumped regions introduce severe losses [26].

The measured lasing threshold was lower and the maximum output power was higher with the off-axis configuration. This can be explained either by lower internal losses or higher small signal gain ($g_0 l$) with the off-axis configuration compared to that with the on-axis configuration. The optimal output coupler reflectivity, as determined by interpolation fitting curves, for the on-axis configuration was 30% and for the off-axis method 18%. This further indicates that the net intracavity gain is higher with the off-axis configuration. The graphs of FIG. 3 show that the laser performance with the off-axis pumping configuration of the invention was an improvement when compared to the on-axis method of the prior art.

Figure 4:
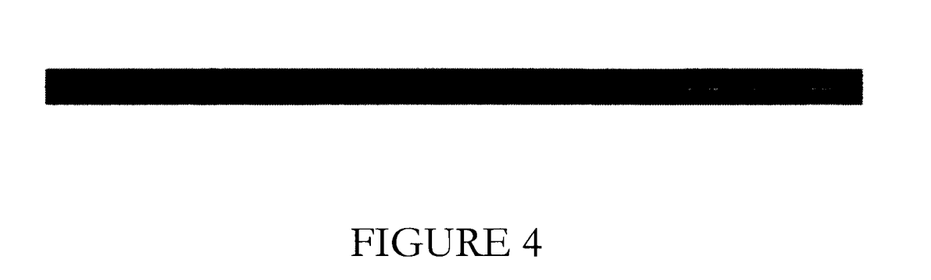
FIG. 4 is a photograph of the active PCF in the apparatus shown in FIG. 2 during laser operation.

During the experiments a photograph of the active PCF were taken from above using a color CCD camera during laser operation. In the photographs a scattered second harmonic of 976 nm were detected at 488 nm. FIG. 4 is a photograph showing a gradient of scattered light at 488 nm along the fiber for the off-axis configuration. In FIG. 4 the right side is the pumping side and the left side is the output coupler side. A pronounced gradient in intensity of the 488 nm light is observed, indicating the pump absorption gradient along the fiber.

Figure 5:
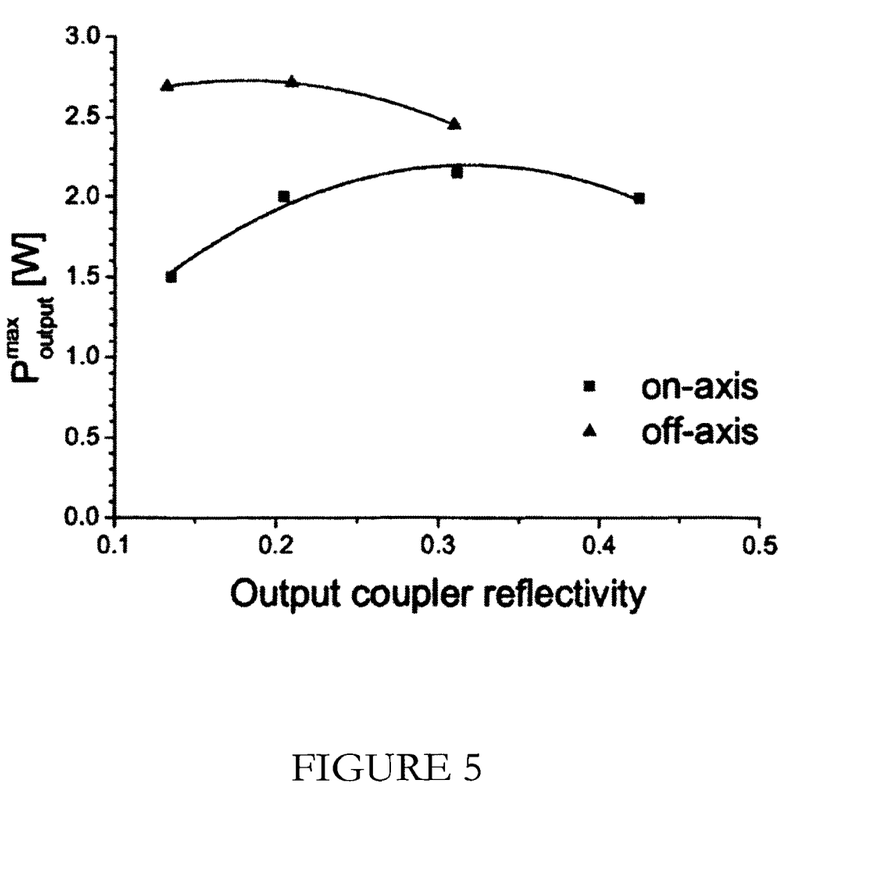
FIG. 5 shows graphs of the output power of the pumped PCF as a function of output coupler reflectivity for both on-axis and off-axis pumping configurations.

In FIG. 3 the measured lasing threshold is lower and the maximum output power is higher with the off-axis configuration. This can be explained either by lower internal losses or higher small signal gain ($g_0l$) with the off-axis configuration compared to that with the on-axis configuration. To further verify this the output power for several output coupler mirrors with different reflectivities was measured. FIG. 5 shows graphs of the output power as a function of output coupler reflectivity for both pumping methods. The solid lines represent interpolation fitting curves. The optimal output coupler reflectivity, as determined by interpolation fitting curves, for the on-axis (lower curve marked by squares) configuration was 30% and for the off-axis (upper curve marked by triangles) configuration was 18%. These graphs further indicate that the net intracavity gain was higher with the off-axis configuration of the invention.

Figure 6:
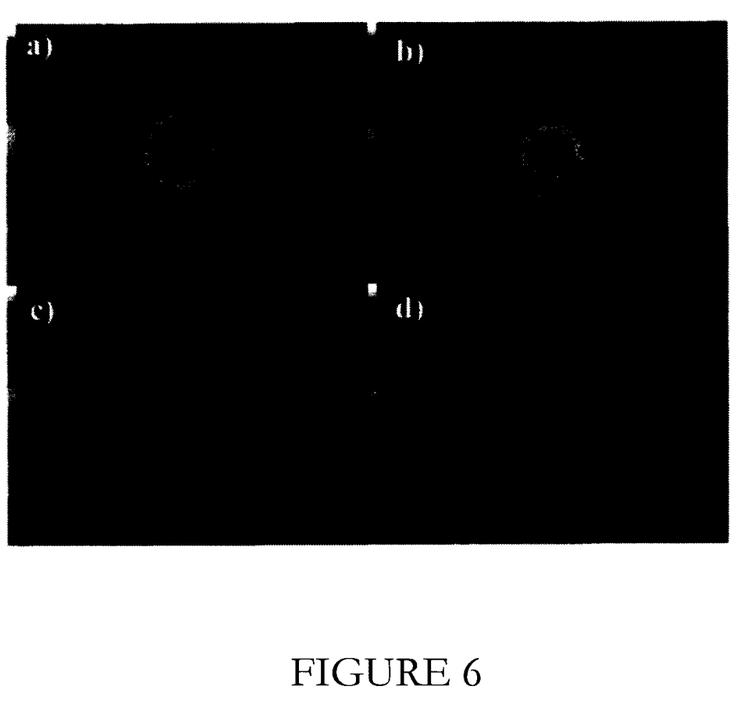
FIG. 6 shows photographs of the measured near-field and far-field intensity distributions of the output laser beam for both on-axis and off-axis pumping configurations.

It has been shown in the prior art that the homogeneity of the pump absorption along the fiber may be affected by asymmetrical pumping [21] as in the case of off-axis pumping. In order to verify that the beam quality of the laser was not affected in the off-axis configuration the beam quality parameter ($M^2$) was measured. FIG. 6 shows photographs of the measured near-field and far-field intensity distributions of the output laser beam. Photographs (a) and (c) are the near-field and far-field results, respectively, with the on-axis method. Photographs (b) and (d) are the near-field and far-field results, respectively, with the off-axis method. From these intensity distributions it was calculated that $M_x^2=1.15$ and $M_y^2=1.19$ for the on-axis configuration and $M_x^2=1.13$ and $M_y^2=1.16$ for the off-axis configuration. These results indicate that the beam quality is not affected by the pumping configuration, and is nearly $TEM_{00}$ (Transmission electron microscopy). Further, the results confirm that the laser performance with the off-axis method of the invention is not degraded, and is actually improved compared to a standard on-axis pumping configuration.

It is to be noted that the method of the invention is applicable not only to PCF double-clad fibers, but also to a large variety of active double-clad fibers, such as: standard step-index fibers, standard gradient index fibers, large mode area (LMA) fibers, and any other type of optical fibers used for lasers or amplifiers that is presently known in the art or will become known in the future.

In addition to the configuration presented and discussed above the present invention also can be applied to many other configurations. A nonlimitative selection of illustrative examples will be schematically illustrated in connection with FIG. 7 to FIG. 10B.

Figure 7:
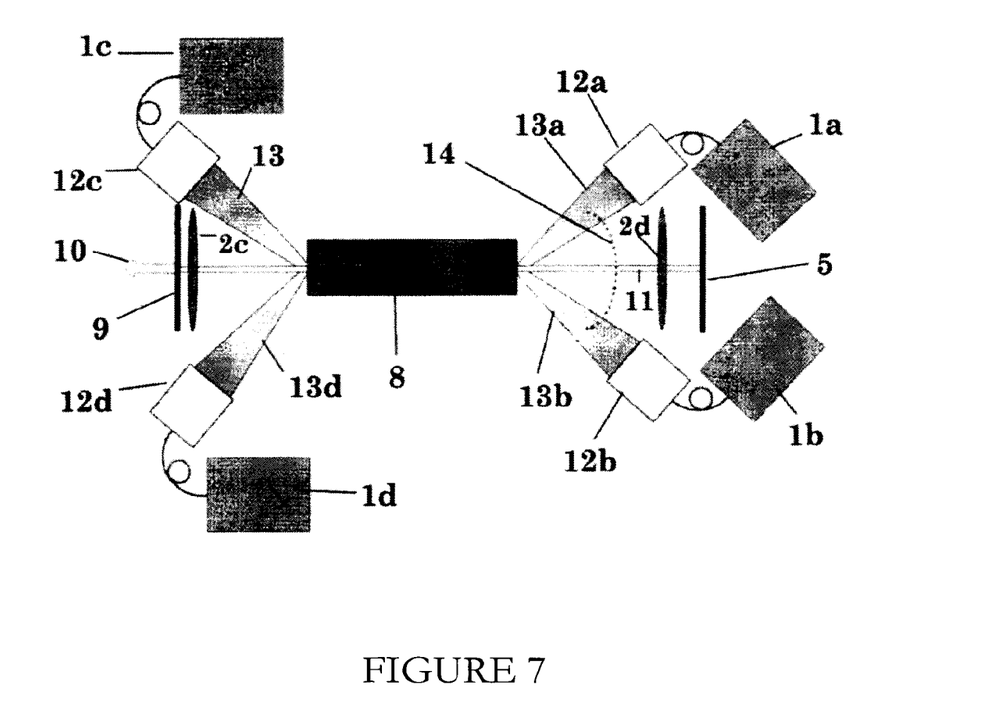
FIG. 7 is a schematic drawing showing an embodiment of the invention that employs multiple off-axis pumping at both ends of the fiber laser.

FIG. 7 schematically shows an embodiment of the invention with multiple independent off-axis pump sources (1a-1d) that are oriented to introduce pumping light into both ends of active fiber (8) from several directions within the cone of numerical aperture (NA). The dotted curved line (14) symbolically indicates that it is possible to scale this off-axis configuration of the invention to include multiple independent pump sources that can each be situated with the same off-axis angle at a different position on a cone whose apex is at a end face of active fiber (8) and whose symmetry axis is coaxial with the optical axis of the active fiber.

Figure 8:
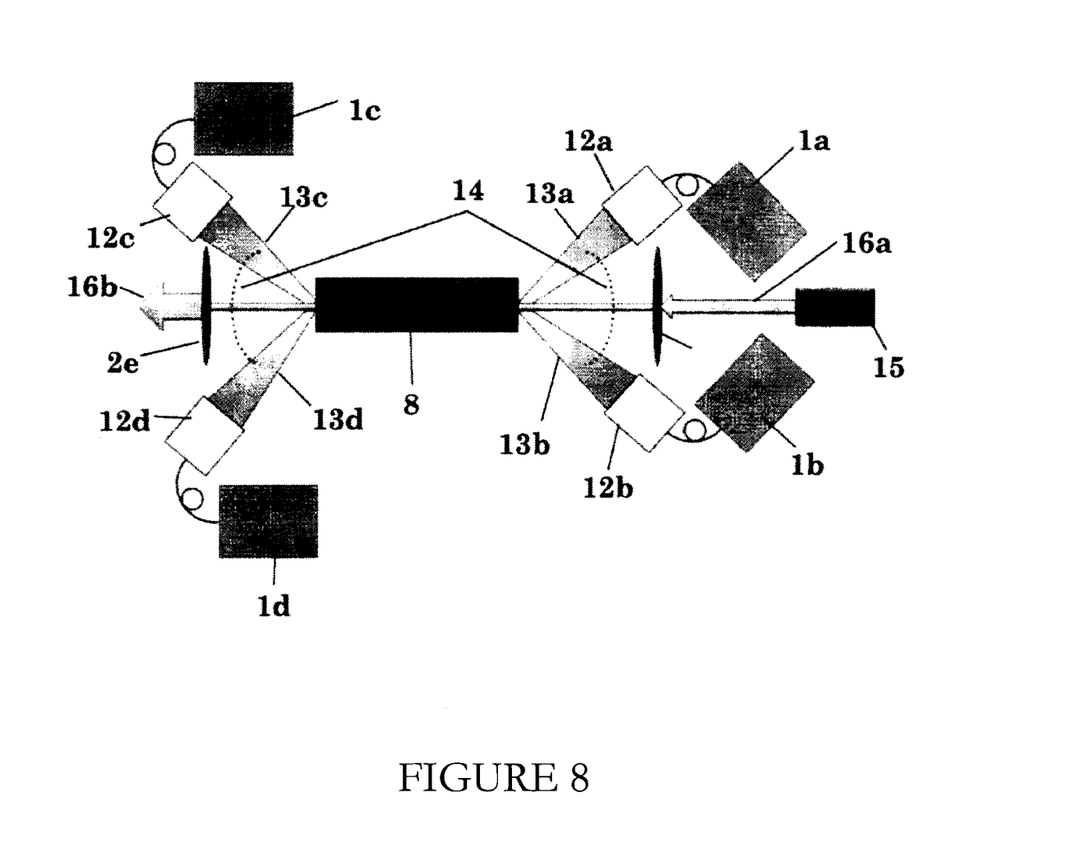
FIG. 8 is a schematic drawing showing an embodiment of the invention that employs multiple off-axis pumping at both ends of a fiber amplifier using a seeder laser source.

FIG. 8 is a schematic drawing showing an embodiment of the invention that is similar to that of FIG. 7. In this embodiment the signal laser is a seeder laser (15). It is also possible to scale this off-axis configuration of the invention to include multiple independent pump (14) sources, each situated at a different position within the cone of numerical aperture (NA), but with the same off-axis angle.

Figure 9:
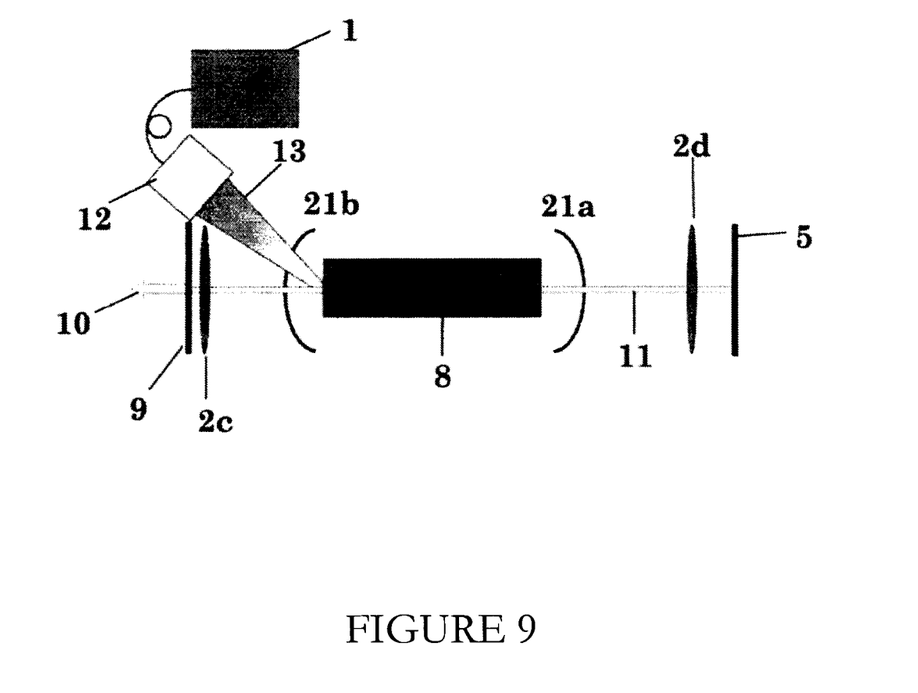
FIG. 9 is a schematic drawing of an embodiment of the invention that employs off-axis pumping and multiple pump passes in a short length fiber.

FIG. 9 schematically shows an embodiment of the invention with multiple pump passes in a short length active fiber. As a result of the use of multiple passes of the pump light in an extremely short active fiber (8) the pump absorption is increased dramatically. The multiple passes are achieved by the use of two concave mirrors (21a) and (21b) one of which is located on each side of the active fiber. The mirrors have either openings through them or special coatings to allow the pump signal (13), and amplified laser beam (11) to pass through. It is to be noted that the concave mirrors can be replaced by other optical systems, for example collimating spherical lenses with flat mirrors.

Figure 10A:
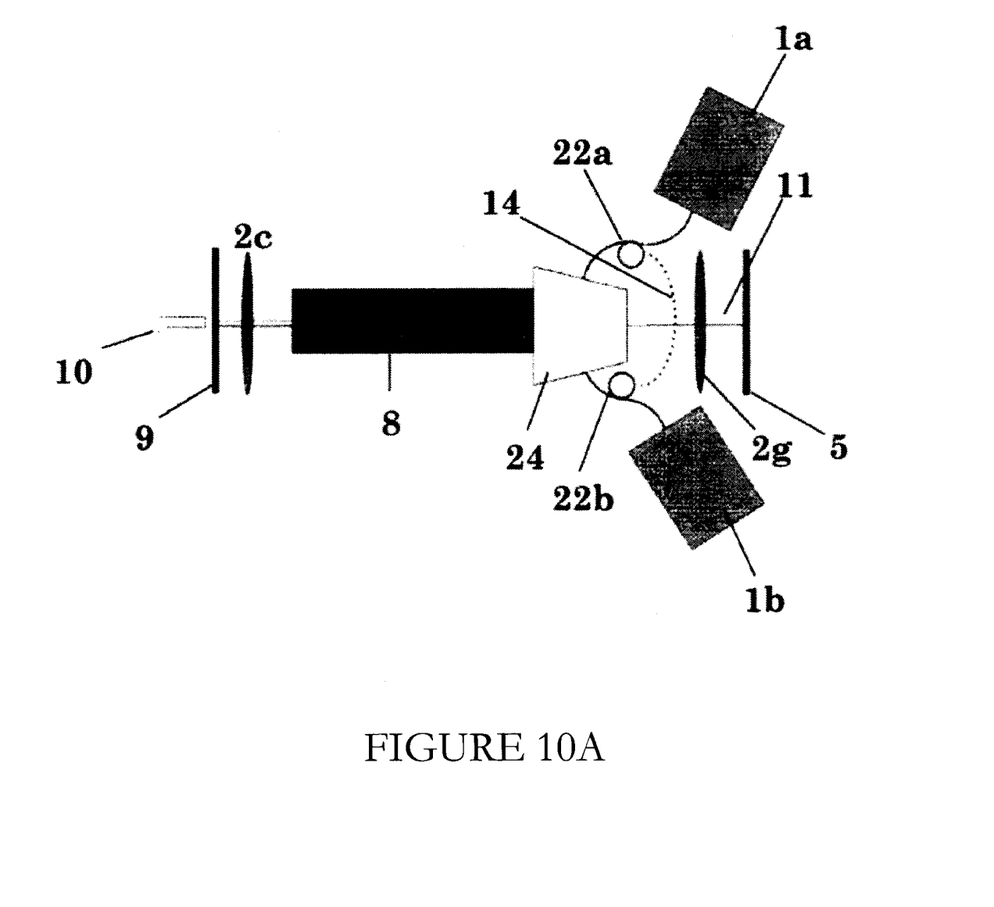
FIG. 10A is a schematic drawing showing an embodiment of the invention that employs direct monolithic (integrated) coupling of pump light into the active double-clad fiber.

FIG. 10A is a schematic drawing showing an embodiment of the invention in which the pump energy is delivered to the active fiber (8) from the pump sources (1a,1b) by means of delivery optical fibers (22a,22b) without the use of focusing optics as in the free space pumping configurations, shown, for example, in FIG. 1 and FIG. 2. The pump light is introduced directly from the ends of the delivery optical fibers into the active fiber (8) by means of monolithic pump coupler (24), which also allows integrated coupling of the light (11) from the signal laser into the active fiber (8).

Figure 10B:
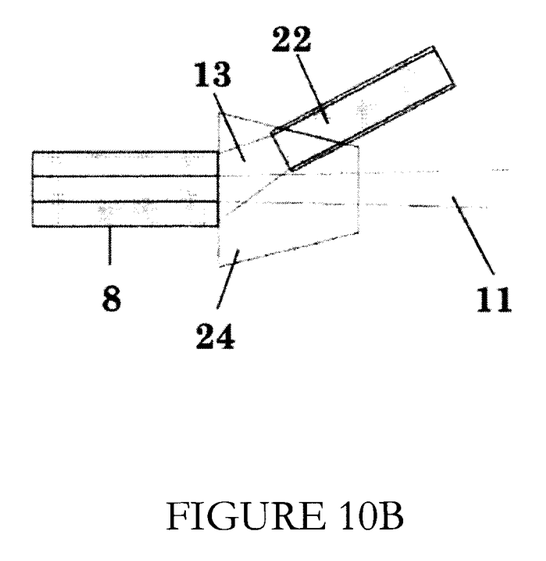
FIG. 10B is a schematic drawing showing a closer view of the connection between one of the pump delivery fibers, the monolithic pump coupler, and the double-clad fiber.

FIG. 10B is a schematic drawing showing a more detailed view of how monolithic coupler (24) couples pump light (13) that exits delivery fiber (22) and the signal laser beam (11) respectively into pump cladding and the central core of the active fiber (8).

Although embodiments of the invention have been described by way of illustration, it will be understood that the invention may be carried out with many variations, modifications, and adaptations, without exceeding the scope of the claims.

BIBLIOGRAPHY

1. C. Jauregui-Misas, S. Böhme, G. Wenetiadis, J. Limpert, and A. Tünnermann, "All-fiber side pump combiner for high-power fiber lasers and amplifiers," in Photonic West, vol. 7580, p. 75801E (SPIE, 2010).
2. J. Xu, J. Lu, G. Kumar, J. Lu, and K. Ueda, "A non-fused fiber coupler for side-pumping of double-clad fiber lasers," Opt. Commun. 220(4-6), 389-395 (2003).
3. J. P. Koplow, S. W. Moore, and A. V. Kliner, "A new method for side pumping of double clad fiber sources," J. Quant. Electron. 39(4), 529-540 (2003).
4. D. J. Rippin and L. Goldberg, "High efficiency side-coupling of light into optical fibres using imbedded v-grooves," Electron. Lett. 31(25), 2204-2205 (1995).
5. F. Gonthier, "Method and Device for optically coupling optical fibers," International Patent Application WO 2008/083482 (2008).
6. M. Faucher, E. Villeneuve, B. Sevigny, A. Wetter, R. Perreault, Y. Lize, and N. Holehouse, "High power monolithically integrated all-fiber laser design using single-chip multimode pumps for high reliability operation," Proc. of SPIE 6873 (2008).
7. F. Gonthier, L. Martineau, F. Seguin, A. Villeneuve, M. Faucher, N. Azami, and M. Garneau, "Optical coupler comprising multimode fibers and method of making the same," U.S. Pat. No. 7,046,875 (2006).
8. D. J. Digiovanni and A. J. Stentz, "Tapered fiber bundles for coupling light and out of cladding-pumped fiber devices," U.S. Pat. No. 5,864,644 (1999).
9. J. J. Larsen and G. Vienne, "Side pumping of double-clad photonic crystal fibers," Optics Letters (OI) 29(5), 436-438 (2004).
10. J. K. Kim, C. Hagemann, T. Schreiber, T. Peschel, S. Böhme, R. Eberhardt, and A. Tünnermann, "Monolithic all-glass pump combiner scheme for high-power fiber laser systems," Opt. Express 18(12), 13,194-13, 203 (2010).
11. F. Gonthier, L. Martineau, F. Seguin, A. Villeneuve, M. Faucher, N. Azami, and M. Garneau, "Optical coupler comprising multimode fibers and method of making the same," U.S. Pat. No. 7,046,875 (2006).
12. D. J. Digiovanni and A. J. Stentz, "Tapered fiber bundles for coupling light and out of cladding-pumped fiber devices," U.S. Pat. No. 5,864,644 (1999).
13. N. L. J. Albinsson, D. M. Kevan, T. P. William, G. A. Borisovich, I. Morten, Z. M. Nickolaos, and P. D. Neil, "Multi-fibre arrangement for high power fibre lasers and amplifiers," U.S. Pat. No. 7,221,822 (2007).
14. J. K. Kim, C. Hagemann, T. Schreiber, T. Peschel, S. Böhme, R. Eberhardt, and A. Tünnermann, "Monolithic all-glass pump combiner scheme for high-power fiber laser systems," Opt. Express 18(12), 13,194-13, 203 (2010).
15. T. Nikolajsen, "Optical coupler device, methods of their production and use," International Patent Application WO 2007/006317 (2007).
16. N. L. J. Albinsson, D. M. Kevan, T. P. William, G. A. Borisovich, I. Morten, Z. M. Nickolaos, and P. D. Neil, "Multi-fibre arrangement for high power fibre lasers and amplifiers," U.S. Pat. No. 7,221,822 (2007).
17. V. Gapontsev and I. Samartsev, "Coupling arrangement between a multimode light source and an optical fiber through an intermediate optical fiber length," U.S. Pat. No. 5,999,673 (1999).
18. Encyclopedia or Laser Physics and Technology, RP Photonics, (http://www.rp-photonics.com/side_pumping.html).
19. J. Limpert and T. Schreiber and A. Tünnermann, (www.rp-photonics.com/highpowerfiberlasers.html) 3, (2005).
20. NKT Photonics, Double-clad photonic crystal fibers, (www.nktphotonics.com).
21. N. A. Mortensen, Opt. Express 15, 8988 (2007).
22. K. P. Hansen and C. B. Olausson and J. Broeng and K. Mattsson and M. D. Nielsen and T. Nikolajsen and P. M. W. Skovgaard and M. H. Sørensen and M. Denninger and C. Jakobsen and others, Proceedings of SPIE, 6873, 687307 (2008).
23. NKT Photonics, Pump absorption in Rod fibers (application note V1.1).
24. O. Schmidt, J. Rothhardt, T. Eidam, F. Miser, J. Limpert, and A. Tünnermann, "Single-polarization ultra-large-mode-area Yb-doped photonic crystal fiber," Opt. Express 16(6), 3918-3923 (2008).
25. D. C. Hannaa and R. M. Percivala and I. R. Perrya and R. G. Smarta and P. J. Suniab and A. C. Tropera, J. Mod. Opt. 37, 517 (1990).
26. W. Koechner, Solid State Laser Engineering (Springer Verlag, 2006).

The invention claimed is:
1. An apparatus for free space pumping of active double-clad fiber based lasers and amplifiers, said apparatus comprising:
 a laser that emits a signal laser beam;
 an active double-clad fiber having a core that defines an optical axis of said apparatus and a pump cladding that defines a cone of numerical aperture (NA);
 a laser optical arrangement adapted to direct said signal laser beam along said optical axis through an end facet into the core of said active double-clad fiber;
 at least one pump source, each of which emits a pump beam;
 at least one delivery means adapted to couple said pump beam to the pump cladding of said active double-clad fiber; and
 an optical arrangement to couple an amplified signal laser beam that exits said active double-clad fiber out of said apparatus;
wherein, a separate one of said delivery means is used to couple each of said pump beams to said pump cladding of said active double-clad fiber from a separate direction but at a same off-axis angle with respect to said optical axis of said apparatus; and wherein, each of said pump beams is directly coupled to said pump cladding through the end facet of said active double-clad fiber.
2. The apparatus of claim 1, wherein the delivery means is at least one of: focusing optics and delivery optical fibers.
3. The apparatus of claim 1, wherein the pump source is a pump diode.
4. The apparatus of claim 1, wherein the active double-clad fiber is selected from the group comprised of: photonic crystal fibers (PCF), standard step-index fibers, standard gradient index fibers, and large mode area (LMA) fibers.
5. The apparatus of claim 1, wherein the off-axis angle is within the cone of numerical aperture (NA) that is defined by the pump cladding of the active double-clad fiber.
6. The apparatus of claim 1, comprising multiple independent off-axis pump sources that are oriented to introduce pumping light through the end facets at into both ends of the active double-clad fiber from several directions within said cone of numerical aperture (NA).
7. The apparatus of claim 1, comprising multiple pump passes in the active double-clad fiber.
8. The apparatus of claim 7, wherein the multiple passes are achieved by the use of two concave mirrors one of which is located on each side of the active double-clad fiber or by collimating spherical lenses with flat mirrors.
9. The apparatus of claim 2, comprising a monolithic coupler at one or both end facets of the active double-clad fiber, said monolithic coupler adapted to couple pump light that exits the delivery optical fibers and the signal laser beam respectively into the pump cladding and the central core of said double-clad active fiber.
10. A method for free space pumping of active double-clad fiber based lasers and amplifiers, said method comprising:
 providing a laser that emits a signal laser beam;
 providing an active double-clad fiber having a core that defines an optical axis of said apparatus and a pump cladding that defines a cone of numerical aperture (NA);
 providing a laser optical arrangement adapted to direct said signal laser beam along said optical axis through the core of said active double-clad fiber;
 providing at least one pump source, each of which emits a pump beam;

providing at least one delivery means adapted to couple said pump beam to the pump cladding of said active double-clad fiber; and providing an optical arrangement to couple an amplified signal laser beam that exits said active double-clad fiber;

wherein, a separate one of said delivery means is provided to couple each of said pump beams to said pump cladding of said active double-clad fiber from a separate direction but at the same off-axis angle with respect to said optical axis; and wherein, each of said pump beams is coupled to said pump cladding through an end facet of said active double-clad fiber.

11. The method of claim 10, wherein the delivery means is at least one of: focusing optics and delivery optical fibers.

12. The method of claim 10, wherein the pump source is a pump diode.

13. The method of claim 10, wherein the active double-clad fiber is selected from the group comprised of: photonic crystal fibers (PCF), standard step-index fibers, standard gradient index fibers, and large mode area (LMA) fibers.

14. The method of claim 10, wherein the off-axis angle is within the cone of numerical aperture (NA) defined by the pump cladding of the active double-clad fiber.

15. The method of claim 10, comprising multiple independent off-axis pump sources that are oriented to introduce pumping light through the end facets at into both ends of the active double-clad fiber from several directions within the said cone of numerical aperture (NA).

16. The method of claim 10, comprising multiple pump passes in the active double-clad fiber.

17. The method of claim 16, wherein the multiple passes are achieved by the use of two concave mirrors one of which is located on each side of the active double-clad fiber or by collimating spherical lenses with flat mirrors.

18. The method of claim 11, comprising a monolithic coupler at one or both end facets of the active double-clad fiber, said monolithic coupler adapted to couple pump light that exits the delivery optical fibers and the signal laser beam respectively into the pump cladding and the central core of said short length of active double-clad fiber.

* * * * *